(12) United States Patent
Gadeken et al.

(10) Patent No.: US 6,215,120 B1
(45) Date of Patent: Apr. 10, 2001

(54) METHOD FOR DETERMINING SYMMETRY AND DIRECTION PROPERTIES OF AZIMUTHAL GAMMA RAY DISTRIBUTIONS

(75) Inventors: Larry L. Gadeken; Gulamabbas A. Merchant, both of Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/276,270

(22) Filed: Mar. 25, 1999

(51) Int. Cl.[7] ........................................ G01V 5/04
(52) U.S. Cl. ............................ 250/256; 250/266
(58) Field of Search .................... 250/264, 267, 250/256, 265, 266

(56) References Cited

U.S. PATENT DOCUMENTS

| | | | |
|---|---|---|---|
| 4,169,979 | * 10/1979 | Arnold et al. | 250/266 |
| 4,864,129 | * 9/1989 | Poske et al. | 250/269 |
| 4,879,463 | * 11/1989 | Wraight et al. | 250/270 |
| 5,410,152 | * 4/1995 | Godeken | 250/260 |

OTHER PUBLICATIONS

Philip R. Bevington; *Data Reduction and Error Analysis For the Physical Sciences*; (1969); (pp. 246–255); McGraw–Hill Book Company.

Glenn F. Knoll; *Radiation Detection and Measurement*; Second Edition; (1979); (pp. 672–681) John Wiley & Sons.

* cited by examiner

Primary Examiner—Seungsook Ham
Assistant Examiner—Richard Hanig
(74) Attorney, Agent, or Firm—Conley, Rose & Tayon, P.C.

(57) ABSTRACT

A method for determining the azimuthal direction of a maximum in a series of gamma ray count measurements that are each assigned to an azimuthal sector, comprising: determining the x- and y-components of the gamma ray counts for each sector, averaging the component values to obtain averaged x- and y-components, and calculating the corresponding aximuthal angle for the maximum by computing the arctangent of the ratio of the averaged y- and x-components.

17 Claims, 1 Drawing Sheet

METHOD FOR DETERMINING SYMMETRY AND DIRECTION PROPERTIES OF AZIMUTHAL GAMMA RAY DISTRIBUTIONS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a method for determining the degree of symmetry and the azimuthal direction of any asymmetry in a circumferential gamma ray measurement. Still more particularly, the present invention relates to an algorithm for locating the azimuthal direction of any minimum or maximum value in a series of measurements that each represent a separate azimuthal sector, and for determining the azimuthal direction with a greater resolution and accuracy than the measuring device provides.

2. Background of the Invention

The recovery of subterranean hydrocarbons such as oil and gas often involves an substantial investment in drill rig structures and expensive drilling operations. In order to maximize the return on both of these expenditures, rig operators may utilize one or more horizontal well bores that branch from a single vertical well bore. For example, the vertical well bore may not be sufficiently close to hydrocarbon deposits to permit recovery. By drilling horizontally from a vertical well bore towards the hydrocarbon deposits, the need for multiple drilling rigs on the surface is eliminated. Moreover, where a vertical well bore has penetrated into a productive hydrocarbon deposit, a horizontal well bore can improve the drainage of hydrocarbons into the well bore.

Effective horizontal drilling is often accomplished by a steerable drilling assembly, such as are known in the art. When drilling horizontally, it is desirable to maintain the well bore in the pay zone, the formation containing hydrocarbons, as much as possible so as to maximize the recovery. However, pay zones may dip or vary in an unpredictable manner. Consequently, as a drilling assembly progresses through a pay zone, the drill bit may approach an adjacent nonproductive stratum. The pay zone and adjacent strata define bed boundaries within which the operator may wish to confine drilling activity. Effective "steering" of the drilling assembly so as to maintain the bore within the pay zone is possible only where the operator has information relating to subterranean geology and knowledge of parameters therein.

Recently, the industry has developed a variety of devices and techniques to collect data during the drilling process. By collecting and processing data during the drilling process, the operator can make accurate modifications or corrections without interrupting drilling, so as to optimize drilling operations. Devices for measuring conditions downhole and the movement and location of the drilling assembly contemporaneously with the drilling of the well have come to be known as "measurement-while-drilling" (MWD) techniques.

Gamma ray (GR) detectors are one type of tool that has been used in MWD operations and that can assist in maintaining a drilling assembly within the pay zone. Gamma rays have characteristic energy spectra that can be used to identify the substance of the source emitting the gamma rays. In passive gamma ray logging, naturally occurring radioactive isotopes, most commonly potassium, uranium and thorium, that are often present in a formation are the source of gamma rays sensed by such passive GR detectors. The incidence of gamma rays on the detectors, along with known information about the response of the tool, gives information about the source of the gamma rays, and thus gives information about the formation itself.

It is known in the art that an azimuthally focused tool can be used to collect gamma ray measurements. Such tools typically generate a series of count totals, where each total corresponds to an azimuthal orientation or the GR detector corresponding to a certain sector of the formation or the borehole. These tools usually comprise a single, rotating, azimuthally focused detector to scan the circumference of the well bore. Alternatively, such a tool can use two or more non-rotating detectors collecting data from complementary sectors of the formation, as disclosed in application Ser. No. 09/276,431, filed concurrently, entitled Radiation Detector and incorporated by reference in its entirety. Normally, gamma ray measurements in a particular pay zone are approximately azimuthally uniform because a pay zone consists mostly of one material, such as sand. Strata material such as shale and sand usually have reasonably unique gamma ray emission counts. As the drilling assembly nears a bed boundary, a directional GR detector will sense a variation in gamma ray measurements. Once the variation is detected and its azimuthal location is established, the operator can make corrections in accordance with known techniques to avoid exiting the pay zone. Thus, one method of maintaining a drilling path through the pay zone is to continually monitor gamma ray emissions proximate to the steerable drilling assembly.

Regardless of the type of tool that is used, the gamma ray count data will typically be in the form of a plurality of azimuthal sectors, for which the gamma ray counts have been totaled. Because the resolution of any answer that is based directly on these data is limited by the number of sectors into which the formation is divided, a method is desired that allows a more accurate determination of the azimuthal location of the variation without increasing tool complexity, size or cost.

SUMMARY OF THE INVENTION

The present invention comprises a method for processing the data relating to count rates in each of a plurality of azimuthal sectors so as to obtain an accurate calculation of the azimuthal location of a detected variation. According to the present method, the total count rate for each azimuthal sector is first compared to the average count rate per sector to determine the degree of asymmetry that is detected. If sufficient asymmetry is detected, the count rate for each sector is broken into mutually orthogonal portions, eg. a cosine and a sine portion, which are summed for all sectors and used to generate an approximate azimuthal direction for the maximum. The present invention improves the accuracy of the determination of azimuthal direction over what would otherwise be available using the same number of sectors.

BRIEF DESCRIPTION OF THE DRAWINGS

For a more detailed description of the preferred embodiments, reference is made to the drawings, wherein.

DETAILED DESCRIPTION OF A PREFERRED EMBODIMENT

As discussed above, the present method utilizes a body of data comprised of azimuthal gamma ray measurements. In instances where the portion of the formation within the detectable range of the tool is uniform, the azimuthal gamma ray measurements will be approximately symmetric around the circumference of the tool. When the tool approaches a formation boundary, i.e. the boundary of a zone that has different (higher or lower) natural gamma ray emitting characteristics than the formation where the tool is currently located, the gamma ray measurements on one side of the tool will change. Hence, it is desirable to determine the degree of asymmetry of the gamma ray data and the azimuthal location of the maximum and/or minimum associated with that asymmetry, so as to enable detection of the approaching bed boundary.

One preferred method for determining the degree of asymmetry of the data and the azimuthal location of the maximum and/or minimum is described in the following paragraphs.

Figure 1:
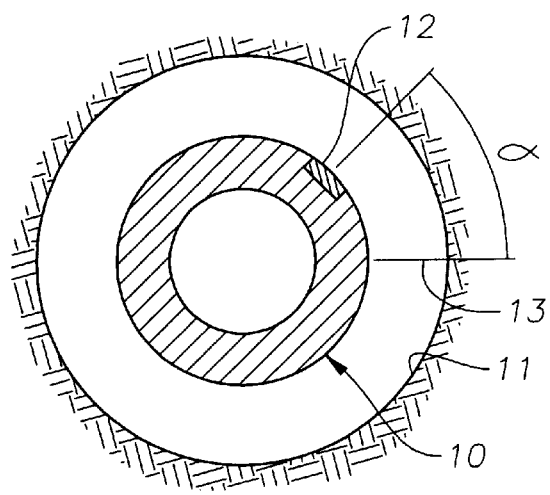
FIG. 1 is a schematic end view of a system for scanning a borehole for gamma ray signals in accordance with the present invention.
Figure 2:
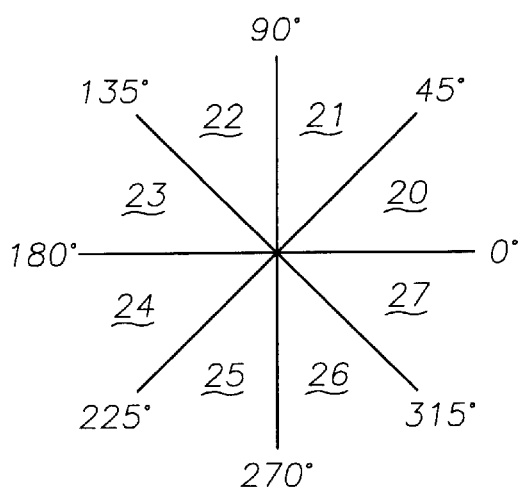
FIG. 2 shows an octant comprised of eight 45° sectors or wedges.

Referring briefly to FIG. 1, a gamma sensor 12 located on a rotating tool 10 inside a borehole 11 is set up to scan the circumference of the hole. An exemplary scanned sector 13 spanning an angle α is shown. The microcontroller in the tool divides the circumference of the tool into a predetermined number of wedges in an x-y plane perpendicular to the drill string axis. The following discussion assumes a right-handed coordinate system wherein the x-axis is horizontal and the y-axis is vertical and opposed to the gravity vector. In one preferred embodiment, the tool constructs an octant comprised of eight 45° wedges, although the number of wedges can be as low as two. FIG. 2 shows an exemplary construct of an octant comprised of eight 45° wedges 20–27. The maximum number of wedges is limited only by measurements hardware and economic constraints. The microcontroller computes the wedge boundaries based on accelerometer and magnetometer data. The microcontroller uses the azimuthal information provided by azimuthally focused detector(s) 12 to index the appropriate wedge storage location when a gamma ray detection event is detected. Thus, at the end of each measurement cycle, the microcontroller contains a cumulative GR count value for each wedge or sector.

While it is possible to run a simple comparison of the total counts received in each wedge during a given measurement cycle in order to determine in which wedge the maximum or the minimum lies, such a comparison gives only an inexact result, as the resolution of the answer is limited by the number of wedges. For example, in the preferred embodiment described above, where the number of wedges is eight, the location of the maximum or minimum can only be specified to within ±45 degrees. Using a higher number of wedges would provide greater resolution, but would require a corresponding increase in the storage capacity of the microcontroller and a corresponding reduction in statistical precision. By using the method described below, a more accurate identification of the azimuthal direction of the gamma ray disparity can be obtained without increasing the number of wedges and without sacrificing the precision of the result. The variables discussed below and their corresponding definitions are defined in the following Table of Definitions.

Table of Definitions

| | |
|---|---|
| $\iota$ | rotation index |
| I | number of rotations per measurement interval |
| o | sector index |
| O | number of sectors (=8 in a preferred embodiment) |
| $\Sigma$ | summation operator (e.g.., $\Sigma_o$ is sum over O index) |
| $\alpha_o$ | azimuthal angel of sector center |
| $\tau_o$ | time (sec) per sector (=$\tau_{o\iota}$) |
| $\eta_o$ | counts per sector (=$\eta_{o\iota}$) |
| $r_o$ | count rate (cnts/sec) per sector (=$r_{o\iota}$ = $n_o/\tau_o$). |
| $\tau_\iota$ | time (sec) per rotation (=$\Sigma_o \tau_o$) |
| $\omega_o$ | sector rotation rate (=$2\pi/O\tau_o$) |
| $\omega_\iota$ | instantaneous rotation rate (=$[2\pi]/\tau_\iota$) |
| T | time (sec) per measurement interval (=$\Sigma\tau_\iota$ = $\Sigma_o\Sigma_\iota\tau_{o\iota}$) |
| T$\iota$ | time (sec) per sector for the measurement interval (=$\Sigma_\iota\tau_{o\iota}$) |
| $N_o$ | counts per sector for the meaurement interval (=$\Sigma_\iota n_{o\iota}$) |
| M | averaged counts per sector (=$\Sigma_o N_o/O$) |
| S | summed counts per measurement interval (=$\Sigma_o N_o$) |
| $R_o$ | count rate per sector for the measurement interval (=$N_o/T_o$) |
| Q | averaged count rate per sector (=$\Sigma_o R_o/O$ = M/T) |
| G | summed count rate per measurement interval (=S/T) |
| $\Omega$ | average rotation rate per measurement interval (=$2\pi I/T$) |
| $X_o$ | X-component of sector count rate (=$R_o\cos[\alpha_o]$) |
| $Y_o$ | Y-component of sector count rate (=$R_o\sin[\alpha_o]$) |
| X | averaged X-component of sector count rate (=$\Sigma_o R_o\cos[\alpha_o]/O$) |
| Y | averaged Y-component of sector count rate (=$\Sigma_o R_o\sin[\alpha_o]/O$) |
| $\alpha$ | azimuthal angle for maximum of gamma distribution (=$\tan^1[Y/X]$) |
| A | vector directed along the α direction (=$[X^2 + Y^2]^{1/2}$ |
| $U_o$ | X-component of inverse sector count rate (=$[1/R_o]\cos[\alpha_o]$) |
| $V_o$ | Y-component of inverse sector count rate (=$[1/R_o]\sin[\alpha_o]$) |
| U | averaged X-value of inverse count rates (=$\Sigma_o[1/R_o]\cos[\alpha_o]/O$) |
| V | averaged Y-value of inverse count rates (=$\Sigma_o[1/R_o]\sin[\alpha_o]/O$) |
| $\beta$ | azimuthal angle for minimum of gamma distribution (=$\tan^{-1}[U/V]$) |
| B | vector directed along the β direction (=$[U^2 + V^2]^{1/2}$) |
| $\sigma_x$ | standard deviation of X-component (=$[1/O]\{\Sigma_o R_o T_o\cos^2[\alpha_o]\}^{1/2}$) |
| $\sigma_y$ | standard deviation of Y-component (=$[1/O]\{\Sigma_o R_o T_o\sin^2[\alpha_o]\}^{1/2}$) |
| $\sigma_u$ | standard deviation of U-value (=$[1/O]\{\Sigma_o[R_o]^{-3}T_o\cos^2[\alpha_o]\}^{1/2}$) |
| $\sigma_v$ | standard deviation of V-value (=$[1/O]\{\Sigma_o[R_o]^{-3}T_o\sin^2[\alpha_o]\}^{1/2}$) |

Determination of Asymmetry

According to a preferred method, the first step in determining whether the tool is approaching a formation boundary is to determine whether the gamma ray count (or count rate) in any wedge, $N_O$ (or $R_O$), differs significantly from the average value, M (or Q). To that end, the chi-squared value, $\chi^2$, is computed from the equation:

$$\chi^2 = [1/M][\Sigma_o[N_o - M]^2 = [T/Q]\Sigma_o[R_o - Q]^2 \quad (1)$$

The reduced chi-squared value, $X^2$, is defined by $$X^2 = \chi^2/[O-1] \quad (2)$$

where the term O−1 is the number of degrees of feedom. The reduced chi-squared value is somewhat more useful than chi-squared itself because $X^2$ is approximately unity when the gamma ray values in each wedge are approximately equal. A suitable range for accepting the hypothesis of a symmetric gamma ray distribution is:

$$0.3 < X^2 < 3.0 \quad (3)$$

In other words, as long as $X^2$ is between 0.3 and 3.0, there is no perceived asymmetry and the GR sonde is presumed to be far from a formation boundary. Note that this chi-squared procedure is a mathematically robust test of the symmetry of the measured azimuthal GR distribution. It will be understood that the upper and lower limits of the range described above are not absolute numbers, and that the threshold values for investigating the azimuthal direction and degree of the asymmetry can be set at any preferred values.

Azimuthal Angle Computations

When the symmetry test described above in Equations (1)–(3) indicates that the observed gamma ray distribution is sufficiently asymmetrical, a computation of the azimuthal direction of the maximum and the minimum of the asymmetrical gamma ray distribution is preferably performed. The first step entails determining the x- and y-components, $X_o$ and $Y_o$, of the gamma ray counting rates for each sector. According to one preferred embodiment of the invention, the component values are then averaged over the sectors using the expressions:

$$X=[1/O]\Sigma_o X_o=[1/O]\Sigma_o R_o \cos [\alpha_o] \qquad (4)$$

and $$Y=[1/O]\Sigma_o Y_o=[1/O]\Sigma_o R_o \sin [\alpha_o] \qquad (5)$$

Figure 3:
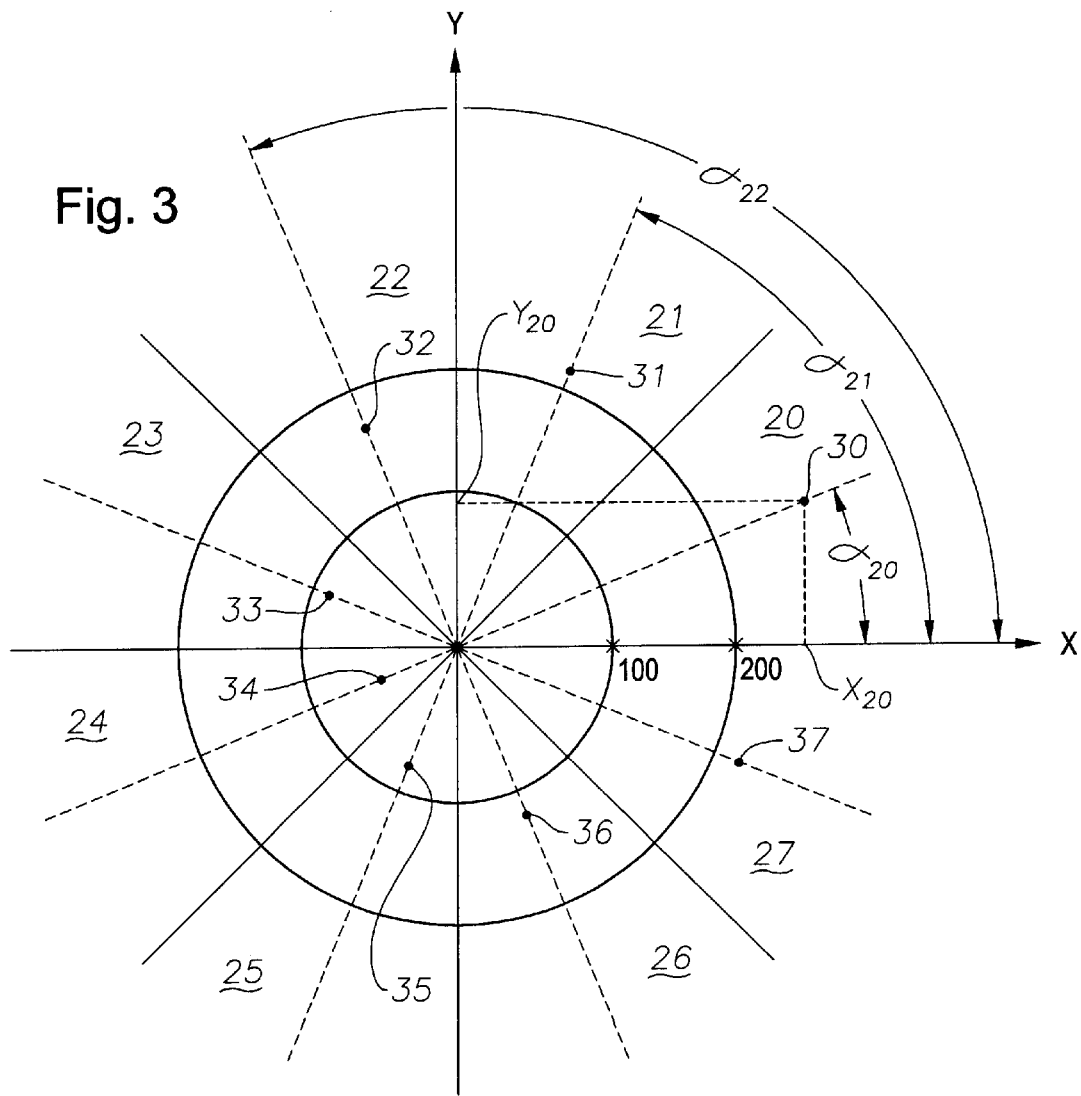
FIG. 3 shows an exemplary asymmetric set of gamma ray counting rates for each sector plotted on a coordinate system.

It will be understood that $N_o$ can be used instead of $R_o$, since $N_o$ will also yield the azimuthal location of the maximum. FIG. 3 shows the gamma ray counting rates 30–37 for each sector 20–27 plotted on an x,y coordinate system and shows the angles $\alpha_{20}$, $\alpha_{21}$, $\alpha_{22}$, of the sector center for three of the sectors 20, 21, 22. Since the count rate for each sector is multiplied by the sine and cosine of the angle defined by the sector center, each count rate 30–37 is shown plotted on the line corresponding to its respective sector center. The calculation of $X_{20}$ and $Y_{20}$, which are the component values of the count rate for exemplary sector 20, is illustrated in FIG. 3 by dashed lines extending from point 30 to the respective axes. The corresponding aximuthal angle for the maximum of the gamma distribution is found by computing the arctangent as shown below $$\alpha=\tan^{-1}[Y/X] \qquad (6)$$

The preferred procedure for finding the minimum is similar, except that the inverse counting rate is employed using the expressions:

$$U=[1/O]\Sigma_o U_o=[1/O]\Sigma_o R_o \cos [\alpha_o] \qquad (7)$$

and $$V=[1/O]\Sigma_o V_o=[1/O]\Sigma_o R_o \sin [\alpha_o] \qquad (8)$$

The azimuth of the minimum is also obtained by calculating an arctangent:

$$\beta=\tan^{-1}[U/V] \qquad (9)$$

While it is expected that $\alpha$ and $\beta$ will be 180° apart for most situations, it is possible to imagine tilted bed boundaries where calculating both angles provides additional information to interpret the significance of the asymmetric gamma distribution.

It may be desirable to associate a vector with the $\alpha$ and $\beta$ angles, at least for log display purposes. A possible definition for such a vector is simply the root mean square value of the associated components. This results in corresponding radial values, A and B, defined as $$A=[X^2+Y^2]^{1/2} \qquad (10)$$

and $$B=[U^2+V^2]^{1/2} \qquad (11)$$

A difficulty with this definition is that it is unphysical, in that A and B cannot be related directly to the obseved counts or count rates. A resonable choice for log display purposes is to use a "tadpole" graphic whose tail direction shows the value of cc. Another procdure would be to make a 3 point interpolation for the gamma ray value in the sector containing a or P and the values for the adjacent sectors on either side. This would also result in smoothly varying values for A and B.

It is appropriate to investigate the errors in determining $\alpha$ and $\beta$ to further evaluate the questions of whether the observed gamma ray count values suggest a symmetric or an asymmetric azimuthal distribution. It is straightforward to write down the set of standard deviations values for $\sigma_\alpha$ and $\sigma_\beta$. However, it appears to be better to investigate the standard deviations $\sigma_X$ and $\sigma_Y$ for the X- and Y- components for the $\alpha$ computation:

$$\sigma_X=[1/O](\Sigma_o R_o T_o \cos^2[\alpha_o])^{1/2} \qquad (12)$$

and $$\sigma_Y=[1/O](\Sigma_o R_o T_o \sin^2[\alpha_o])^{1/2} \qquad (13)$$

as well as the corresponding standard deviations for the angle of the minimum:

$$\sigma_U=[1/O](\Sigma_o [R_o]^{-3} T_o \cos^2[\alpha_o])^{1/2} \qquad (14)$$

and $$\sigma_V=[1/O](\Sigma_o [R_o]^{-3} T_o \sin^2[\alpha_o])^{1/2} \qquad (15)$$

In addition, $\sigma^X$ and $\sigma^Y$ define an error ellipse that can be used to check output of the forgoing calculations. For example, if the angle of the maximum, $\alpha$, falls in an sector that is closer to the y-axis than to the x-axis and the standard deviation of the y-component $\sigma_Y$ is greater than the absolute value of X, then statistically the distribution may not be sufficiently asymmentric to conclude that the tool is close to a distinct formation boundary. A corresponding analysis applies if $\alpha$ falls near the x-axis and the standard deviation of the x-component $\sigma_X$ is greater than the absolute value of Y.

The error analysis herein assumes that the only uncertainties which need to be considered are those due to Poisson counting statistics. It is assumed that the errors in establishing the sector boundaries are negligible in comparison. The error estimates should be modified to include sector boundary errors if these are actually comparable to the statistical errors.

The total gamma ray counting rate, G, is simply the sum of the sector counting rates. This value is preferably converted to API units using a predetermined conversion factor established by calibration in known gamma environments. It should be noted that the maximum range of natural gamma rays in earth formations is about 3 ft. As a practical matter, it is unlikely that the gamma ray sensor will register any significant asymmetries further away from a distinct formation boundary than 2 feet. This may vary somewhat depending on the difference in gamma ray signals between two adjacent formation zones.

What is claimed is:

1. A method for determining the azimuthal direction of a maximum in a series of gamma ray measurements, comprising:

(a) assigning each gamma ray measurement to an azimuthal sector so as to generate a sector count rate for each sector;

(b) determining the x- and y-components of the sector count rate for each sector;

(c) averaging the component values obtained in step (b) to obtain averaged x- and y-components; and (d) calculating the corresponding azimuthal angle for the maximum by computing the arctangent of the ratio of the averaged y- and x-components calculated in step.

2. The method according to claim 1, further including the step of determining whether the series of measurements meets a predetermined standard of asymmetry.

3. The method according to claim 2 wherein the step of determining whether the series of measurements meet a predetermined standard of asymmetry comprises:

calculating a reduced chi-squared value, $X^2$, by summing the squares of the differences between the count in each sector and the average counts per sector and dividing the sum by the average counts per sector and by one less than the number of sectors according to the equation $X^2=[1/(O-1)][1/M]\Sigma_o[N_o-M]^2$, wherein O is the number of sectors, M is the average counts per sector, o is the sector index and $N_o$ is the counts per sector of the measurement interval; and determining whether the reduced chi-squared value, $X^2$, is within a predetermined range.

4. The method according to claim 2 wherein the step of determining whether the series of measurements meet a predetermined standard of asymmetry comprises:

calculating a reduced chi-squared value, $X^2$, by summing the squares of the differences between the count rate ($R_o$) in each sector and the average count rate per sector (Q) and dividing the sum by the average count rate per sector (Q) and by one less than the number of sectors (O) according to the equation $X^2=[1/(O-1)][T/Q]\Sigma_o[R_o-Q]^2$, wherein o is the sector index and T is the time per measurement interval; and determining whether the reduced chi-squared value, $X^2$, is within a predetermined range.

5. The method according to claim 1, further including the step of calculating a vector for the azimuthal direction by calculating the root mean square of the averaged y- and x-components calculated in step (b).

6. The method according to claim 1 wherein step (a) includes the step of calculating $\Sigma_o R_o \cos[\alpha_o]$, where $R_o$ is the count rate per sector for the measurement interval in question and $\alpha_o$ is the azimuthal angle of the sector center.

7. The method according to claim 1 wherein step (a) includes the step of calculating $\Sigma_o R_o \sin[\alpha_o]$, where $R_o$ is the count rate per sector for the measurement interval in question and $\alpha_o$ is the azimuthal angle of the sector center.

8. The method according to claim 1, further including the step of calculating the azimuthal direction of a minimum in the series of gamma ray count rates by performing steps (a)–(c) on the inverses of the count rates.

9. A method for steering a drill bit, comprising the steps of:

(a) measuring a formation characteristic in a plurality of measurements, indexing each of the measurements to an azimuthal sector so as to generate a gamma ray count rate for each sector; and (b) calculating the azimuthal location of the maximum of the measurements by (i) determining the x- and y-components of the gamma ray counting rates for each sector;

(ii) averaging the component values obtained in step (b)(i) to obtain averaged x- and y-components; and (iii) computing the arctangent of the ratio of the averaged y- and x-components calculated in step (b)(ii).

10. The method according to claim 9, further including the step of:

(c) controlling the drill bit in response to the information generated in step (b).

11. The method according to claim 9, further including the step of:

(c) determining whether the plurality of measurements meets a predetermined standard of asymmetry.

12. The method according to claim 11 wherein step (c) comprises:

(i) calculating a reduced chi-squared value, $X^2$, by summing the squares of the differences between the count in each sector and the average counts per sector and dividing the sum by the average counts per sector and by one less than the number of sectors according to the equation $X^2=[1/(O-1)][1/M]\Sigma_o[N_o-M]^2$, wherein O is the number of sectors, M is the average counts per sector, o is the sector index and $N_o$ is the counts per sector of the measurement interval; and (ii) determining whether the reduced chi-squared value, $X^2$, is within a predetermined range.

13. The method according to claim 11 wherein step (c) comprises:

(i) calculating a reduced chi-squared value, $X^2$, by summing the squares of the differences between the measured value in each sector and the average value in all sectors and dividing by the sum of the average value and by one less than the number of sectors according to the equation $X^2=[1/(O-1)][T/Q]\Sigma_o[R_o-Q]^2$, wherein O is the number of sectors, T is the time per measurement interval, Q is the averaged count rate per sector, o is the sector index and $R_o$ is the count rate per sector for the measurement interval; and (ii) determining whether the reduced chi-squared value, $X^2$, is within a predetermined range.

14. The method according to claim 9, further including the step of calculating a vector for the azimuthal direction by calculating the root mean square of the averaged y- and x-components calculated in step (b).

15. The method according to claim 9 wherein step (b)(i) includes the step of calculating $\Sigma_o R_o \cos[\alpha_o]$, where $R_o$ is the count rate per sector for the measurement interval in question and $\alpha_o$ is the azimuthal angle of the sector center.

16. The method according to claim 9 wherein step (b)(i) includes the step of calculating $\Sigma_o R_o \sin[\alpha_o]$, where $R_o$ is the count rate per sector for the measurement interval in question and $\alpha_o$ is the azimuthal angle of the sector center.

17. The method according to claim 9, further including the step of calculating the azimuthal direction of a minimum in the series of gamma ray count rates by performing steps (a)–(b) on the inverses of the count rates.

* * * * *